United States Patent [19]
Maayan

[11] Patent Number: 5,355,446
[45] Date of Patent: Oct. 11, 1994

[54] METHOD AND APPARATUS FOR PREPARING PICTURE MASKS

[75] Inventor: Lior Maayan, Tel Aviv, Israel

[73] Assignee: Scitex Corporation Ltd., Herzua Bet, Israel

[21] Appl. No.: 935,305

[22] Filed: Aug. 26, 1992

[30] Foreign Application Priority Data

Dec. 6, 1991 [IL] Israel ................................ 100256

[51] Int. Cl.⁵ ........................................... G06F 15/68
[52] U.S. Cl. ........................................................ 395/134
[58] Field of Search ................ 395/133, 134, 119, 120; 345/113, 118; 382/22, 46, 64

[56] References Cited

U.S. PATENT DOCUMENTS

| | | | |
|---|---|---|---|
| 4,849,911 | 7/1989 | Campian | 364/521 |
| 4,884,224 | 11/1989 | Hirosawa | 364/550 |
| 5,038,291 | 8/1991 | Wang et al. | 364/476 |
| 5,048,099 | 9/1991 | Lee | 382/22 |

FOREIGN PATENT DOCUMENTS

0173098 3/1986 European Pat. Off. .
0427251 5/1991 European Pat. Off. .

*Primary Examiner*—Phu K. Nguyen
*Attorney, Agent, or Firm*—Benjamin J. Barish

[57] ABSTRACT

A method and apparatus for preparing a fine mask of a boundary on a picture of an area of interest to be separated from the remainder of the picture by: storing a digitized representation of the picture, and of a rough mask defining the approximate boundary of the area of interest; and then sequentially selecting regions of search on the rough mask to identify boundary segments, each subsequent region of search being selected by extrapolation from the preceding region of search in the direction of boundary segments identified by the preceding region of search, until the first region of search is met or until a boundary segment is not found in the region of search, whereupon the next region of search is selected by interpolation between the preceding region of search and the closest point on the approximate boundary defined by the rough mask.

28 Claims, 15 Drawing Sheets

R.O.S SELECTION PROCEDURE
- EXTRAPOLATION CASE

R.O.S SELECTION PROCEDURE
- INTERPOLATION CASE

1. SEARCH PROCEDURE FAILS

P2 POSITION:
INTERPOLATION
BETWEEN P1 POSITION & V2 POSITION
BY HALF R.O.S SIZE

2. DIRECTION FROM GUIDELINE

∝ = ANGLE BETWEEN GUIDELINE
& DIRECTION OF SEARCH

IF ∝ > PREDEFINED THRESHOLD
THEN INTERPOLATE

P2 POSITION:
INTERPOLATION
BETWEEN P1 POSITION & V2 POSITION
BY HALF R.O.S SIZE

R.O.S SELECTION PROCEDURE
- INTERPOLATION CASE

3. DISTANCE FROM GUIDELINE

P1 - point out of "tunnel search"

D - maximum distance between boundary segment & guideline

P3 position :
interpolation
between P2 position & V2 position
by half R.O.S size

MULTIPLE (8-) BIT MASK CALCULATION

1. EDGE SEGMENT CASE

2. RASTER CASE

COLOR DISTANCE FROM MASK BOUNDARY

CD - PREDEFINED WIDTH OF INFLUENCE
IF CD = 0 THEN IT IS A 1 - BIT MASK

METHOD AND APPARATUS FOR PREPARING PICTURE MASKS

FIELD AND BACKGROUND OF THE INVENTION

The present invention relates to a method and apparatus for preparing picture masks, and particularly for preparing a fine mask of a boundary on a picture of an area of interest to be separated from the remainder of the picture.

The purpose of mask preparation is to "cut" an area of interest and to extract it from its background. When cutting a mask, the contour line should be as smooth as possible. In addition, only the area of interest should be in the mask, to ensure that when that area is cut and placed on a different background, there is no "noise" resulting from the original background. It is desirable that the resolution of a mask be at least as high, or higher, than the resolution of the original picture.

At the present time, the mask of a multi-colour picture is generally prepared manually in the following manner: the separation photograph of the multi-colour picture, on which the area of interest is the most obvious, is placed on a light table, and that area is painted with an opaque paint. The resulting film is then photographed to obtain the mask area, which is photographed again together with each separation to obtain the final picture. Masks are also prepared by the use of computerized systems, which provide various tools for this purpose. One tool used in mask preparation is the polygon, or smooth mask. In drawing this type of mask, the operator draws a precise contour of the masked area. However, this procedure is relatively slow since the operator has to be accurate work. Although speed increases with operator experience, the contour is only as good as the operator's accuracy.

Another tool provides the operator with the means to add a pixel to a range of CMYK (cyan, magenta, yellow, black) values that determine the masked pixels. This is a fast and accurate technique, but cannot be used in most cases since the CMYK values of the area of interest within and outside the mask overlap. In addition, since the resulting map has only raster information and not vector information, its resolutions cannot be higher than the original picture. Most of the time, masks prepared using this tool need to be retouched in order to smooth boundaries and clean the mask.

Both of the above tools are used when the picture is displayed in maximum resolution.

It can thus be seen that mask preparation according to the above existing procedures is very time-consuming particularly if good quality masks are to be produced.

A number of techniques have been described in the patent literature to improve the above existing procedures.

According to the procedure described in DE2920070 (Israel Patent 60083), an examination zone of predetermined width is specified and the coordinates of the image dots located within the examination zone are determined; the image dots which belong to those coordinates for their tone value, and the precise coarse of the contour is determined from the tone value differences between the individual image dots.

Another technique as described in U.S. Pat. No. 4,884,224, approximate information regarding the position of the contour on the original film is processed with image sensor data in order to calculate an absolute contour line position. According to a still further technique described in Duenyas and Yad-Shalom Israel Patent Application 88286 (assigned to the same assignee as the present application), the edge segments of the picture are produced by examining rectangular sections of variable width, length and orientation.

OBJECTS AND BRIEF SUMMARY OF THE INVENTION

An object of the present invention is to provide a method and apparatus for preparing masks of fine quality (fine rresolution) which will take substantially less time, will be less dependent upon the skill of the operator, and will require significantly less data entry by the operator.

According to one aspect of the present invention, there is provided a method of preparing a fine mask of a boundary on a picture of an area of interest to be separated from the remainder of the picture, comprising the operations: (a) storing in storage means a digitized representation of the picture, and of a rough mask defining the approximate boundary of the area of interest; (b) selecting a first region of search of predetermined configuration starting with one point on the rough mask; (c) retrieving picture data within the selected region of search from the storage means and processing the retrieved picture data to identify a boundary segment representing the portion of the boundary within the region of search; (d) selecting the position of the next region of search by extrapolation from the preceding region of search in the direction of the boundary segment identified in the preceding region of search; (e) retrieving picture data within the next region of search from the storage means and processing the retrieved picture data to identify the next boundary segment representing the position of the boundary within the next region of search; and (f) repeating operations (d) and (e), to successively select the next regions of search by extrapolation and to find the boundary segments therein, until the next region of search meets the first region of search, or until encountering the condition that a boundary segment is not found in the region of search, whereupon the next region of search is selected by interpolation between the preceding region of search and the closest point on the approximate boundary defined by the rough mask.

According to further features in the preferred embodiment of the invention described below, operations (d) and (e) are repeated per operation (f) until encountering a second condition, that the boundary segment is not found to be in the region of search within a predetermined distance from the approximate boundary defined by the rough mask, whereupon the next region of search is also selected by the same manner of interpolation as when the first condition is encountered.

In the preferred embodiment of the invention described below, operations (d) and (e) are repeated per operation (f) until encountering a third condition, that the boundary segment is not found to be in the region of search within a predetermined angle from the approximate boundary defined by the rough mask, whereupon the next region of search is also selected by the same manner of interpolation as when the first condition is encountered.

According to further features in the described preferred embodiment, the method includes the further operation of converting all the boundary segments to a raster format following operation (f).

According to still further features in the described preferred embodiment, when a region of search is selected, an examination is performed to determined whether the picture content within the selected region of search is of a spatial frequency higher than a predefined value, and if so, a raster patch is produced in the respective region of search rather than a boundary segment; the raster patch being converted with all the found boundary segments to a raster format following operation (f).

As will be described more particularly below, the method of the present invention enables the preparation of masks of fine quality in substantially less time than the prior conventional methods, with less dependency on the skills and experience of the operator, and with significantly less data entry by the operator.

Further features and advantages of the invention will be apparent from the description below.

BRIEF DESCRIPTION OF THE DRAWINGS

The invention is herein described, by way of example only, with reference to the accompanying drawings, wherein:

FIGS. 10a–10d are pictorial illustrations helpful in explaining the heuristic procedures for processing the picture data to produce boundary segments.

DESCRIPTION OF A PREFERRED EMBODIMENT

The Method in General

Figure 1:
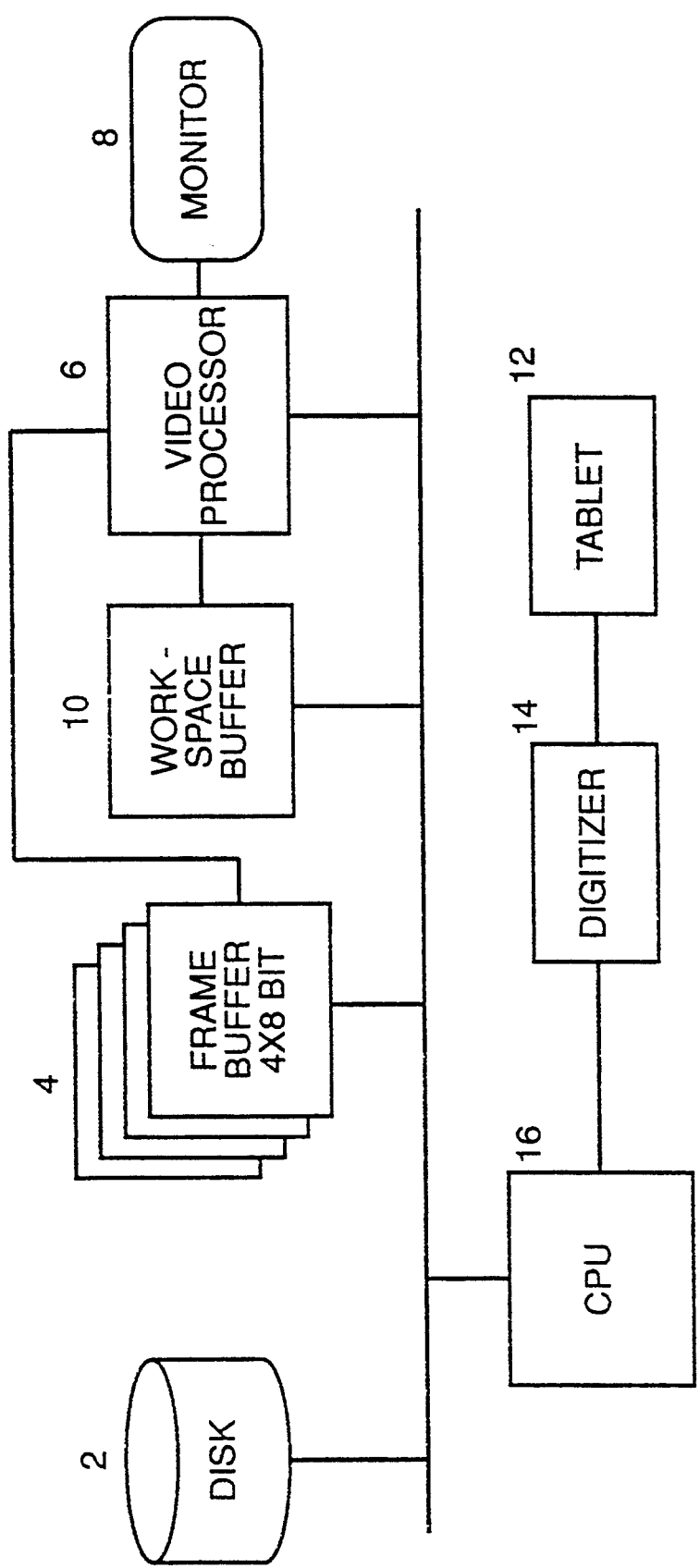
FIG. 1 is a block diagram illustrating one form of apparatus for practising the method of the present invention.

The mask cutting technique of the described embodiment, as illustrated in the drawings, is basically a colour image segmentation procedure based on rough information specified by the user, or provided by other means as described below. This information comprises any broad definition of the area of interest, including:

1. a low resolution mask - user definable, which appears as a region of the full picture displayed to the user;
2. an inter-system mask - defined in the scanning stage, which appears in a design work station or in any early processing stage;
3. a coarse polygon mask;
4. a density rough mask, or other density information;
5. information regarding regional interest; and
6. any other means of preprocessing rough spatial information.

The method of the invention as described below creates a mask in a batch environment (off-line computer process) by means of colour image segmentation which includes:

1. a region of search (ROS) selection;
2. a colour transformation and edge detection;
3. high spatial frequency criteria;
4. heuristic search on colour edge data; and
5. thresholding of colour transformed image, for high spatial frequency regions.

The method described below and illustrated in the drawings is for preparing a fine mask of a boundary on a picture of an area of interest to be separated from the remainder of the picture. Briefly, the described method comprises the following operations:

(a) storing in storage means a digitized representation of the picture, and of a rough mask defining the approximate boundary of the area of interest;

(b) selecting a first region of search of predetermined configuration starting with one point on the rough mask;

(c) retrieving picture data within the selected region of search from the storage means and processing the retrieved picture data to identify a boundary segment representing the portion of the boundary within the region of search;

(d) selecting the position of the next region of search by extrapolation from the preceding region of search in the direction of the boundary segment identified in the preceding region of search;

(e) retrieving picture data within the next region of search from the storage means and processing the retrieved picture data to identify the next boundary segment representing the position of the boundary within the next region of search; and (f) repeating operations (d) and (e), to successively select the next regions of search by extrapolation and to find the boundary segments therein, until the next region of search meets the first region of search, or until encountering the condition that a boundary segment is not found in the region of search, whereupon the next region of search is selected by interpolation between the preceding region of search and the closest point on the approximate boundary defined by the rough mask.

In the described method, operations (d) and (e) are repeated to successively select the next regions of search by extrapolation, until a boundary segment is not found in the region of search, or is not found to be in the region of search within a predetermined distance, or within a predetermined angle, from the approximate boundary defined by the rough mask. When any one of the above conditions is encountered, the next region of search is selected, not by extrapolation, but rather by interpolation between the preceding region of search and the closest point on the approximate boundary defined by the rough mask. The regions of searches are selected in this manner, i.e., normally by extrapolation but by interpolation if one of the above conditions if encountered, until the next region of search selected meets with the first region of search, thereby indicating that the fine mask has been completed.

When a region of search is selected, an examination is performed to determine whether the picture content within the selected region of search is of a spatial frequency higher than a predefined value. If so, a raster patch is produced in the respective region of search, rather than a boundary segment. The raster patch, together with all the found boundary segments, are converted to a raster format at the end of the boundary segment searches. Such an arrangement thus provides high resolution in regions of high spatial frequency, i.e., highly detailed regions.

In the described method, whenever a region of search position is selected by interpolation, the region of search for finding a boundary segment is increased in size (doubled in the described embodiment) over the predetermined size for the region of search. This dynamic change in size of the region of search enables a wider search to be executed. It will thus be seen that the region of search selected is not a preprocessing stage, as in some prior known techniques, but rather is a dynamically changing and integral part of the processing stage, depending on the results of the current edge segment, or raste patch, found.

The Apparatus

FIG. 1 is a block diagram illustrating one form of data processor system which may be used for implementing the above-described mask-cutting technique.

The data processor system illustrated in FIG. 1 comprises a storage device 2 for storing the multi-coloured picture in CMYK form, and a frame buffer 4 including four storage devices, each or storing the picture information in C,M,Y and K form, respectively. The system further includes a video processor 6 that enables the user to select one or more colour components of the picture, or separtions, to be displayed on a colour monitor 8. The processor converts the CMYK colour system to an RGB (red, green, blue) system, so that the picture is displayed in the display monitor 8 in RGB form. A workspace buffe 10 is used as the workspace to show the defined mask.

The system further includes an input device 12, in the form of a tablet or pointer (e.g., mouse), a digitizer 14 for digitizing the input data, and a CPU (central processor unit) which includes program control means for controlling the overall operation of the data processing system.

The frame buffer 4 includes four indentical storage devices for the CMYK separations, each having a capacity to hold at least one colour separation of the picture in a zoomed-down form to at least 512×512 pixels. For example, each storage device in the frame buffer 4 may include eight bits for each pixel, to provide each pixel with a value of 0–255.

The workspace buffer 10 stores the rough information (e.g., from a polygon mask) as entered by the operator via input device 12, and also stores the digitized line produced by the CPU 16. The fine mask is displayed in the display monitor 8 after having been processed in the video processor 6. The frame buffer 4 could include sufficient storage capacity so as also to serve as the workspace buffer 10.

Overall Mask Cutting Technique

The overall mask cutting technique described below is generally shown in the block diagram of FIG. 2.

A rough mask, schematically indicated by block 20, is inputted into the system in digitized form to define the approximate boundary of the area of interest. The approximate boundary of the area of interest may be specified in a wide variety of manners, including: a user definable coarse mask having low resolution and the full picture (block 21); a user definable region of interest, such as coarse polygon mask (block 22); an inter-system mask defined in the scanning stage and appearing on a design work station or on any early processing stage (block 23); an automatic mask apparatus (block 24); a low resolution mask (block 25); a density rough mask or other density information (block 26); or any other means of pre-processing rough spatial information (block 27).

The information in the rough mask is processed with the digitized information representing the picture, as stored in the computer, by batch processing techniques (28), as will be described more particularly below. However, there is an interactive processing by the user for preview purposes (block 29) creating a low resolution mask which is shown in the monitor (8, FIG. 1), and which may be interactive with the batch processing operations of block 28.

The output is a high resolution fine mask (block 31), which is also displayed on the monitor 8. The user may, if desired, make corrections (block 32) before the processing of the mask is completed (block 33) and the fine mask outputted from the system (block 34).

Figure 3:
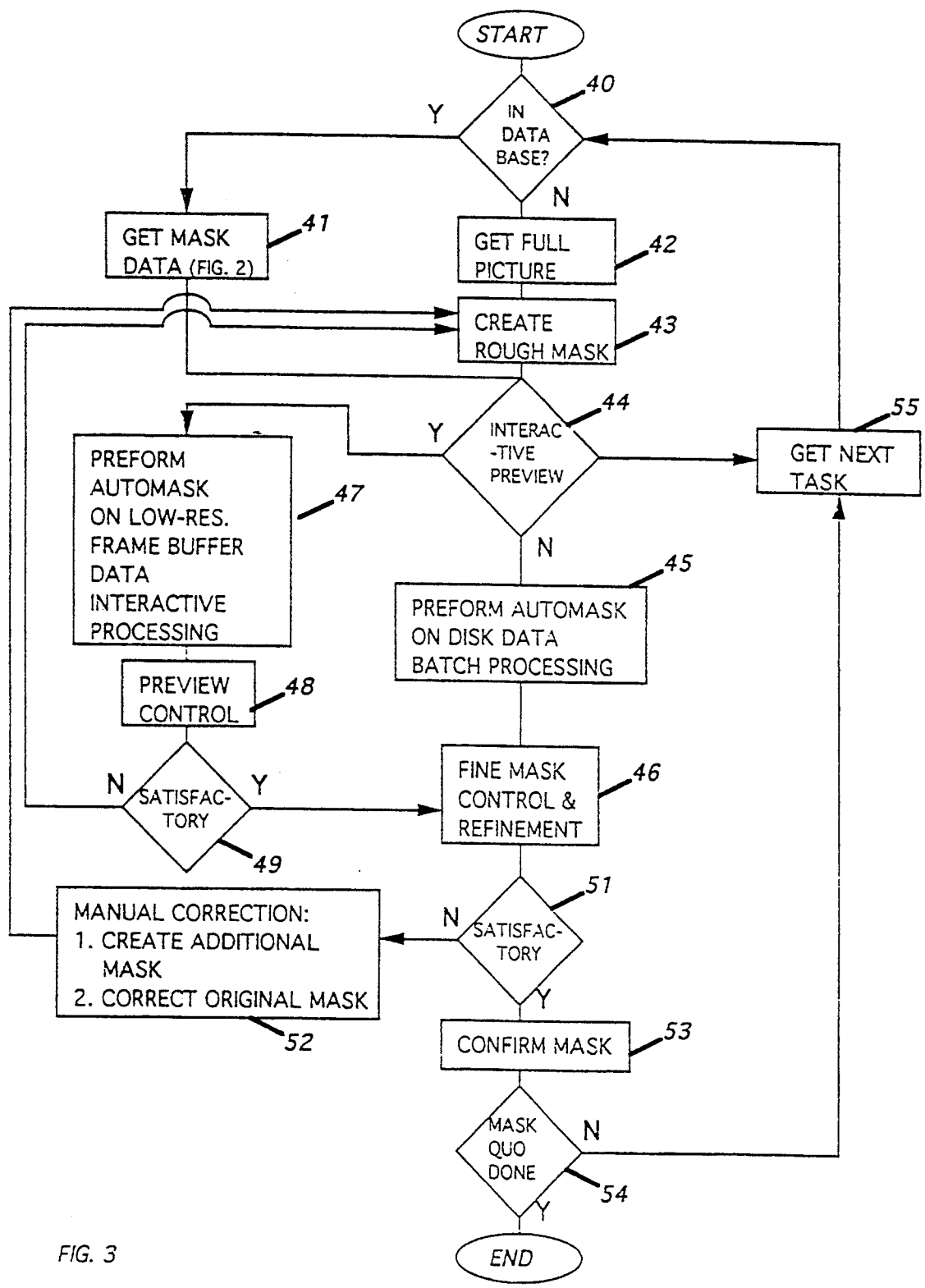
FIG. 3 is a block diagram illustrating the work flow according to the method of the present invention.

FIG. 3 is a diagram illustrating the work flow in the above-described method.

Thus, the user checks first to see whether the rough mask data is in the database (block 40). If yes, it retrieves the rough mask data (block 41); and if not, it produces its own rough mask by retrieving the full picture data (block 42) and creates the rough mask, e.g., a polygon smooth rough mask (block 43).

Figure 2:
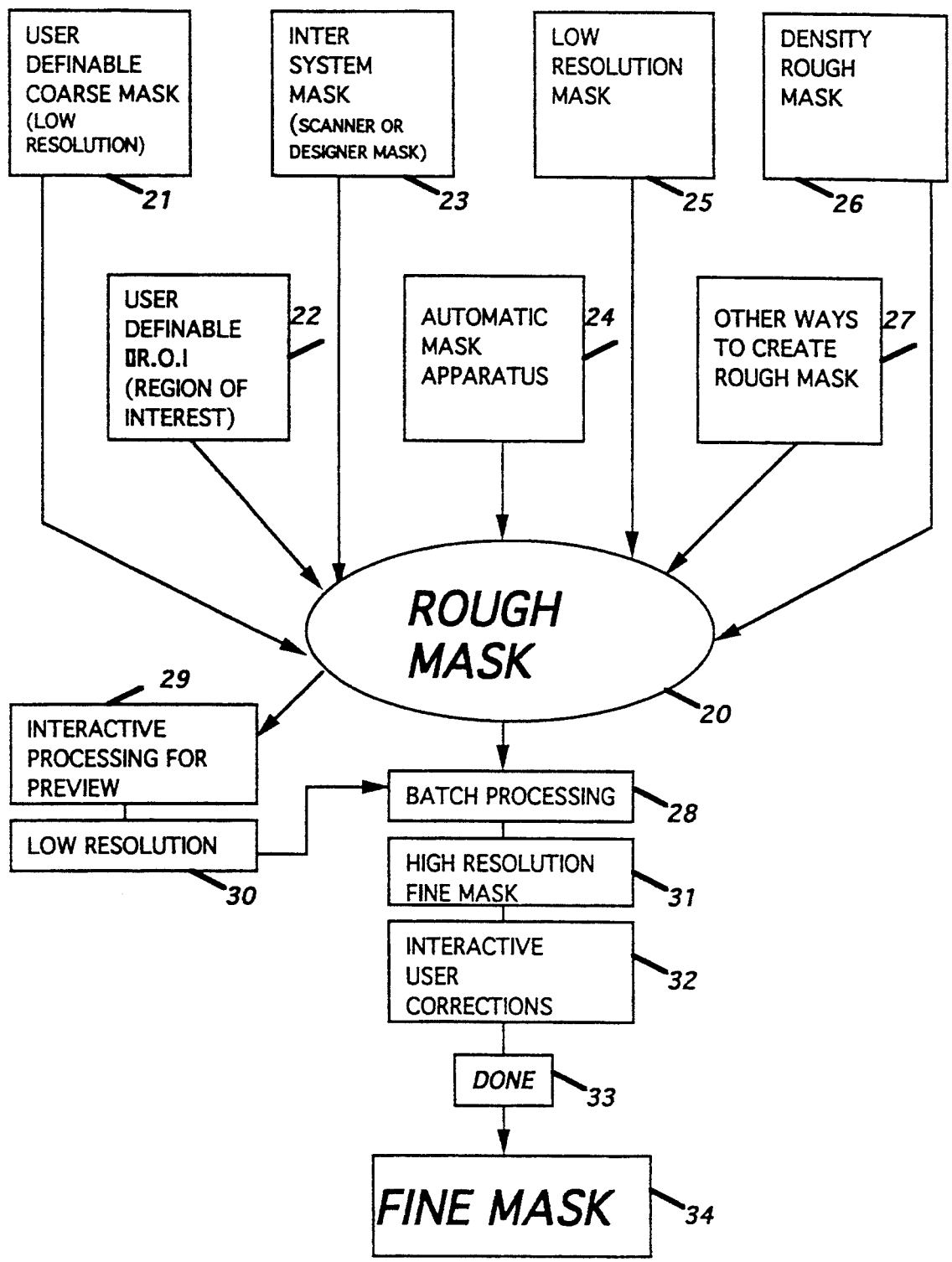
FIG. 2 is a block diagram illustrating the overall process to be practised in accordance with the present invention.

The computer then checks to see whether an interactive preview of the rough mask is desired per block 29 in FIG. 2 (block 44, FIG. 3), in which a low resolution rough mask is seen on the monitor (8, FIG. 1). If this option is not desired, the system performs an automask operation on the disc data by batch processing (block 45), as will be described more particularly below with respect to the flow charts of FIGS. 4–6. The output of this operation may be interactively corrected by the user (block 46). On the other hand, if a preview is desired for interactive processing (per blocks 29, 30 in FIG. 2), the system performs an automask operation on the low resolution data from the frame buffer. This is done by interactive processing by the user (blocks 47 and 48). If the results as shown on the monitor 8 are satisfactory, the system then proceeds to block 46 to output the fine mask. If the preview is not satisfactory, the system permits manual corrections to be made, such as to create additional for supplemental masks, or to correct the original mask (block 52), before returning to block 43.

When the created fine mask is found satisfactory (block 51), the mask is confirmed (block 53), and then a check is made to see whether other masks are to be done (block 54). If so, the system proceeds to the next task (block 55) to create the next mask, in the manner described above; but if no further masks are to be prepared, the operation ends.

Automask Preparation

Figure 4:
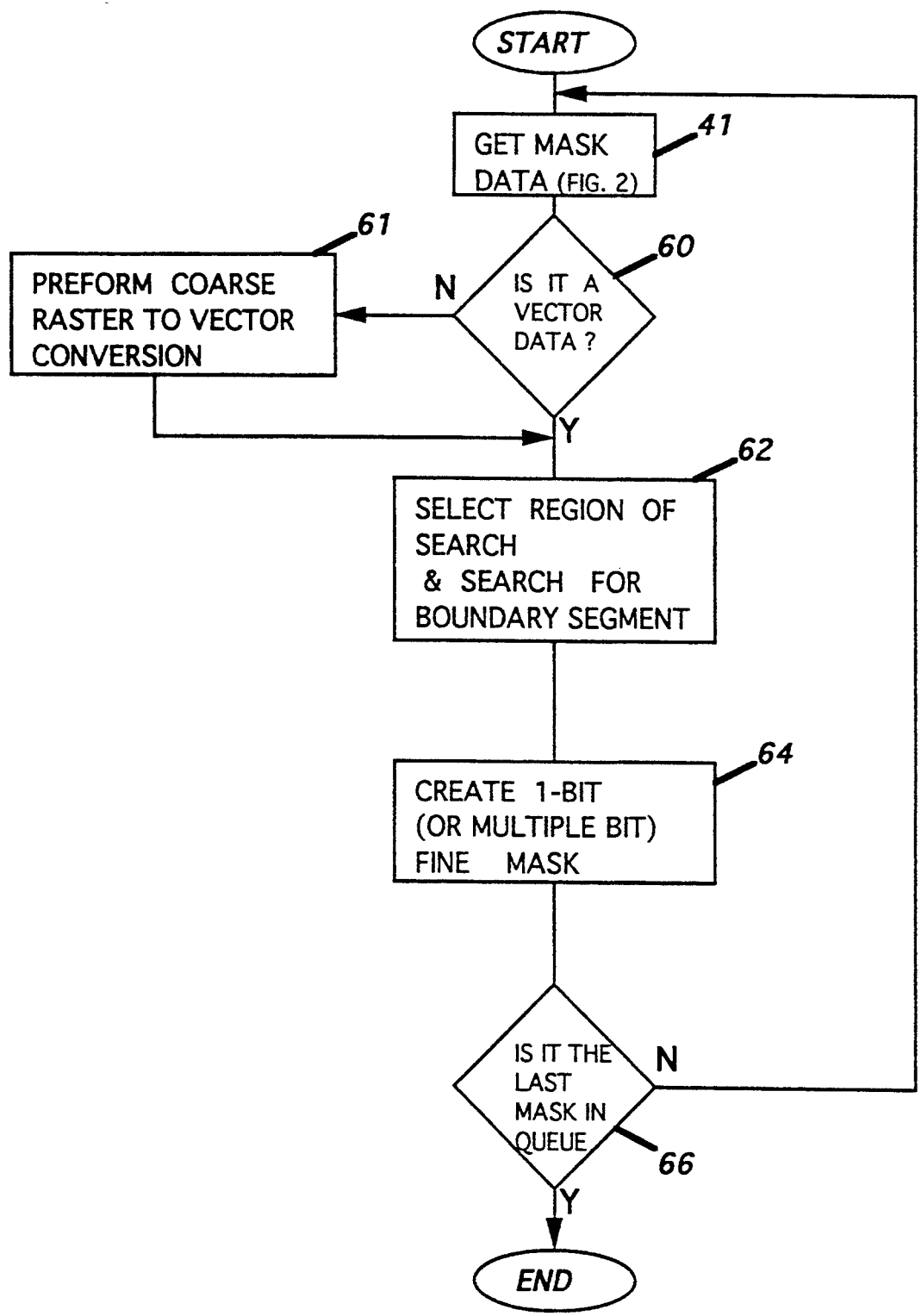
FIG. 4 is a flow chart of the overall process.

FIG. 4 more particularly illustrates the preparation of the automask on the disc data, as represented by block 45 in FIG. 3.

Thus, as shown in the flow chart of FIG. 4, after the rough mask data is obtained (per block 41 in FIG. 3), a check is made to determine whether the rough mask is in the form of vector data (block 60, FIG. 4). If the rough mask data is not in the form of vector data (i.e., it is in the form of raster data), the coarse raster data is converted to vector data (block 61). The vector data then becomes the initial guide line for cutting the fine mask.

The operator then selects a first region of search of predetermined configuration, starting with one point on the vectorized rough mask, and a search is made for a boundary segment in this region (block 62). In this search, the picture data within the selected region of search is retrieved from the storage, and is processed to find a boundary segment representing the portion of the boundary within the region of search.

As will be described more particularly below in connection with the flow chart of FIG. 5, the selection of each region of search is effected by extrapolation from the preceding region of search in the direction of the boundary segment found in the preceding region of search; however, when certain conditions (as described below) are encountered, the next region of search is selected, not by extrapolation, but rather by interpolation between the preceding region of search and the closest point on the approximate boundry defined by the rough mask vector. This operation continues until the next region of search meets the first region of search, which means that a loop has been completed and all the boundary segments for the respective mask have been found.

The system then proceeds to the operation indicated by block 64 in FIG. 4. This operation involves the creation of a one-bit, or a multiple-bit, fine mask, as will be described more particularly below with respect to FIGS. 12-12c.

The foregoing operations, as illustrated in FIG. 4, are repeated for each mask in the queue (block 66).

The Selection and Search of Each Region of Search

Figure 5:
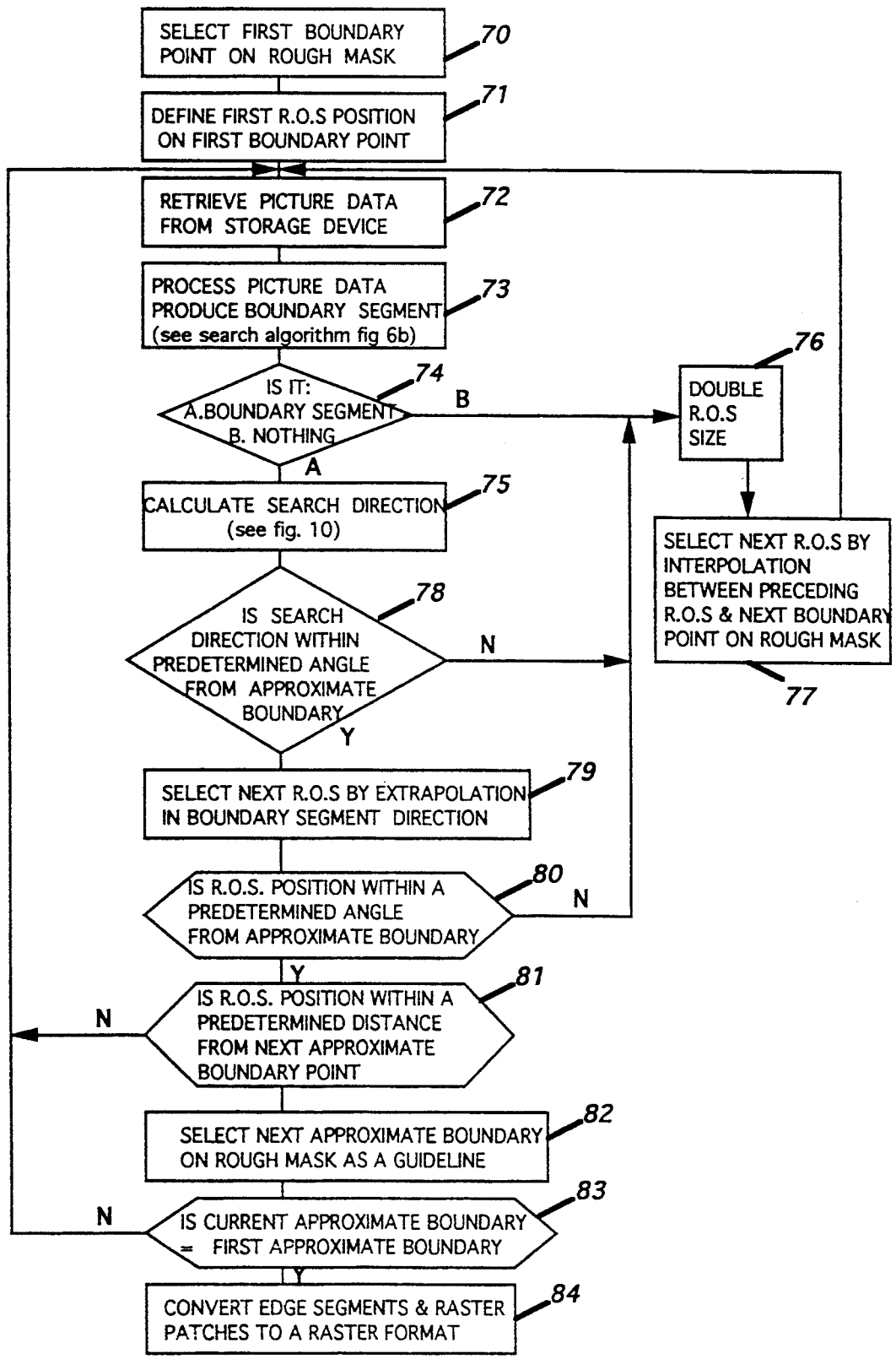
FIG. 5 is a flow chart of the Select Region of Search operations in the flow chart of FIG. 4.
Figure 7:
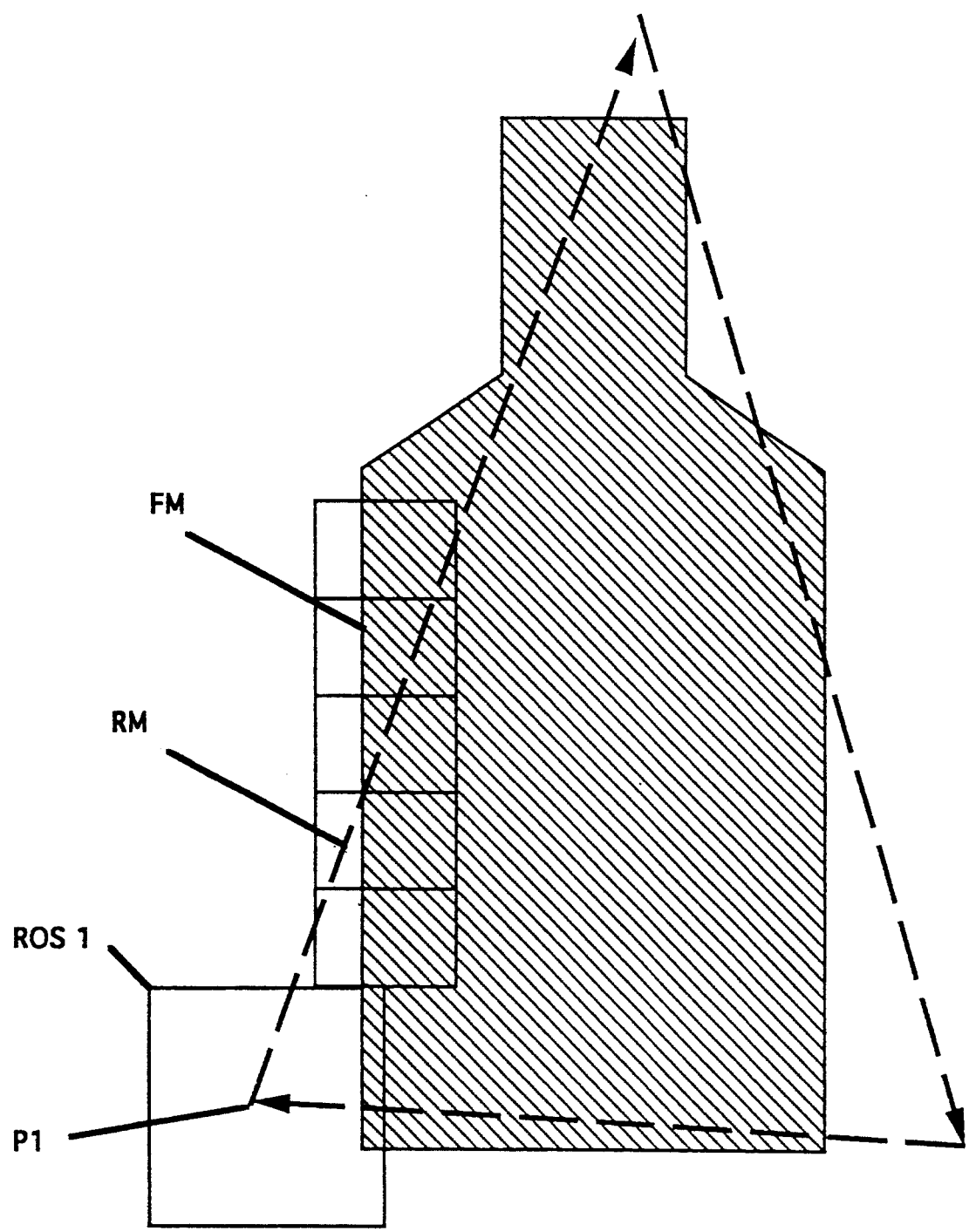
FIG. 7 pictorially illustrates one example of producing a fine mask in accordance with the present invention.

The selection and search of each region of search, as indicated by block 62 in FIG. 4, is more particularly illustrated in the flow chart of FIG. 5, the pictorial illustration in FIG. 7, and the diagrams of FIGS. 8a, 8b and 9a-9c.

The first operations are to select the first boundary point on the rough vectorized mask (block 70), and to define the first region of search position on the first boundary point (block 71). This is more particularly seen in the pictorial illustration in FIG. 7, wherein the broken lines RM represent the vectors of the rough mask indicating the approximate boundary segments, and the continuous smooth line FM represents the fine mask of the boundary segments to be eventually cut. Thus, the middle point $P_1$ of the first region of search $ROS_1$ is selected to be on the first point of the vectorized rough mask RM.

The picture data is retrieved from the storage device for this region of search (block 72), and is processed to produce a boundary segment in the respective region of search (block 73). The specific procedure for accomplishing this is more particularly illustrated in the flow chart of FIG. 6, described below.

A check is then made to determine whether a boundary segment was indeed found in the region of search (block 74). If so, the search direction is calculated for the next region of search.

Figure 8A:
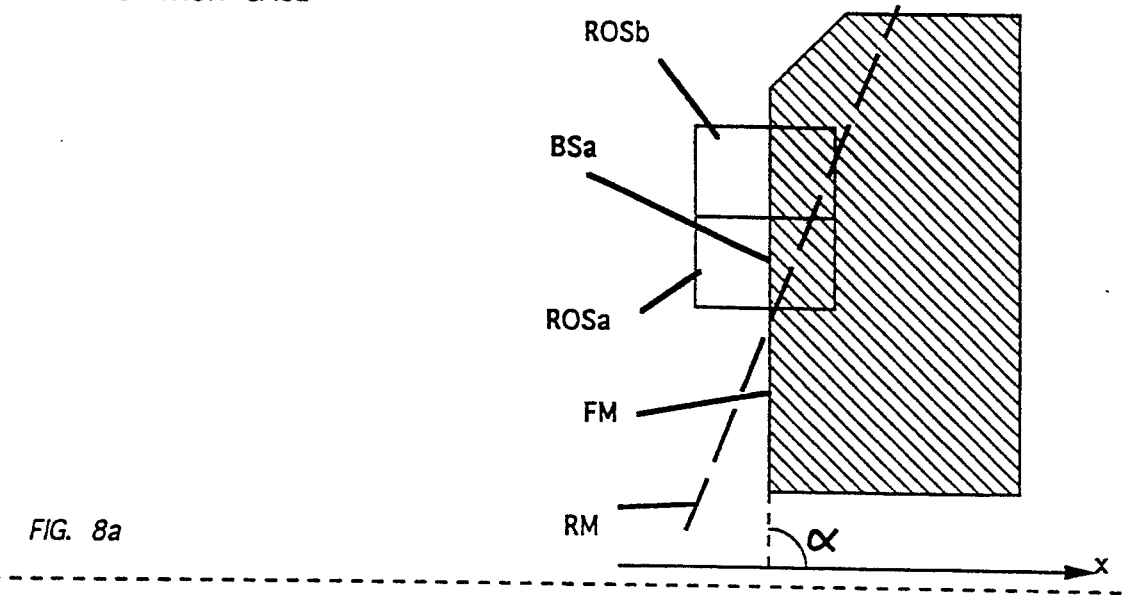
FIGS. 8a and 8b are diagrams helpful in explaining the Region of Search Selection procedure in an extrapolation case.
Figure 8B:
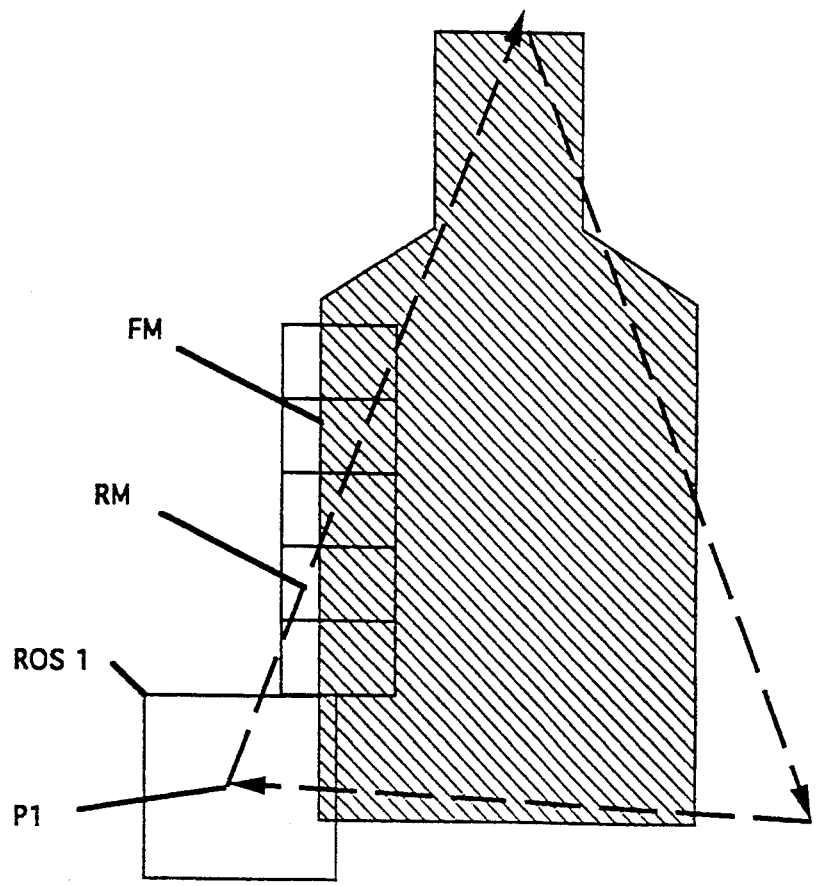

Normally this so done by extrapolation in the direction of the boundary segment in the preceding region of search as more particularly illustrated in the diagram of FIG. 8a. Thus, as shown in FIG. 8a, when the boundary segment BSa of one region of search ROSa is found, the direction of the next region of search ROSb is selected by extrapolation from the preceding region of search ROSa in the direction (indicated by angle $\alpha$) of the boundary segment BSa found in the preceding region of search. Subsequent regions of search are normally selected in the same manner of extrapolation, as shown in FIG. 8b.

On the other hand, if in the check made in block 74, no boundary segment is found within the selected region of search, the next region of search ROSb is selected not by extrapolation, but rather by interpolation. This is more particularly shown in FIGS. 9a-9c.

Figure 9A:
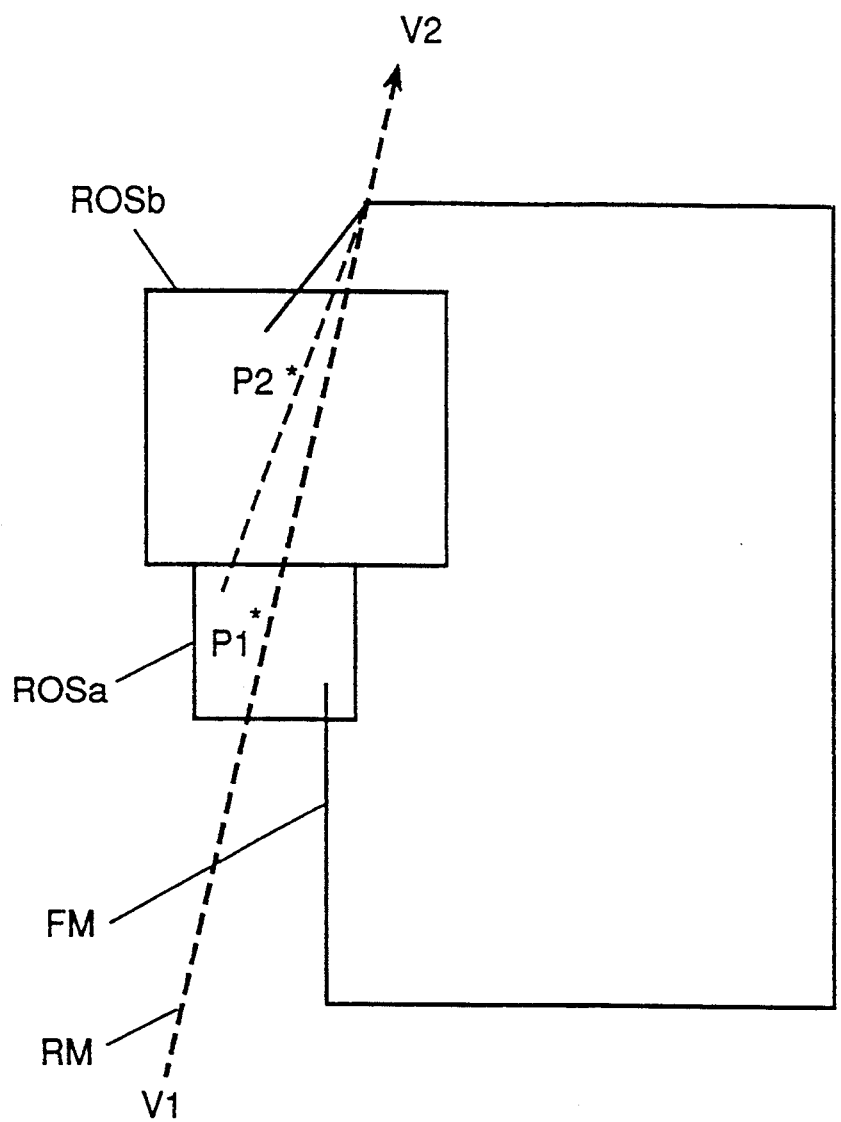
FIGS. 9a, 9b and 9c are diagrams helpful in explaining the Region of Search Selection procedure in three types of interpolation cases.

Thus, FIG. 9a shows that there is a break in the fine mask FM in the region of search ROSa. The next region of search ROSb is first doubled in size and is selected by interpolation (rather than extrapolation) between points $P_1$ of the preceding region of search ROSa and point $V_2$, representing the closest point on the rough mask vector RM in the direction of the preceding region of search. Point $P_2$ is then determined as one-half the distance between points $P_1$ and $V_2$. Point $P_2$ represents the middle point of the region of search ROSb. After the region of search has so been selected by interpolation, the system returns to the operation of block 72, to retrieve picture data of that region of search from the storage device.

Figure 9B:
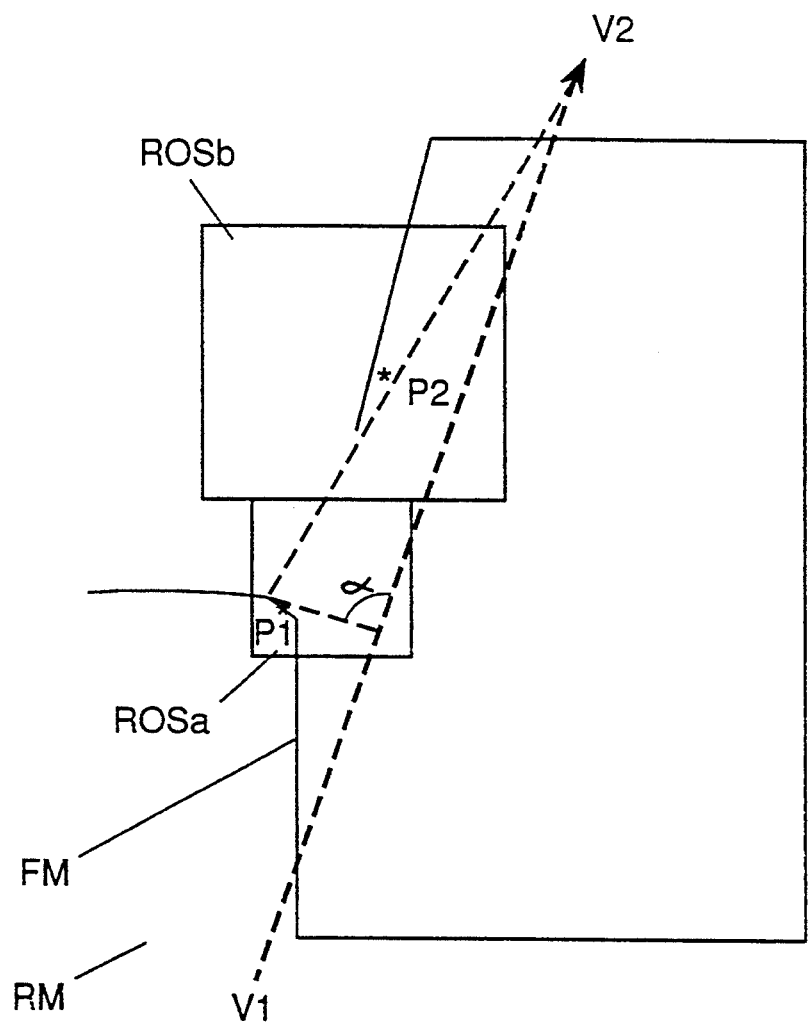

Another condition which, if encountered, causes the system to select the next region of search by interpolation, rather than by extrapolation, is indicated by block 78 in the flow chart of FIG. 5, and in the diagram of FIG. 9b. Thus, even though a boundary segment is found in the respective region of search, a check is made to determine whether the search direction (as calculated per block 75 in FIG. 5 and the diagram of FIG. 8a) is within a predetermined threshold angle from the approximate boundary defined by the vectorized rough mask RM. If the search direction as determined by block 78 is not within a predetermined threshold angle, then the next region of search is not selected by extrapolation, but rather is again selected by interpolation as described above with respect to blocks 76 and 77 in the flow chart of FIG. 5, and the diagram of FIG. 9a.

Figure 9C:
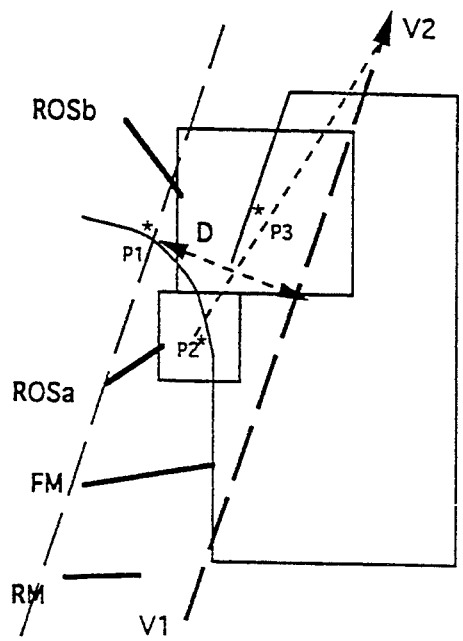
Figure 10D:
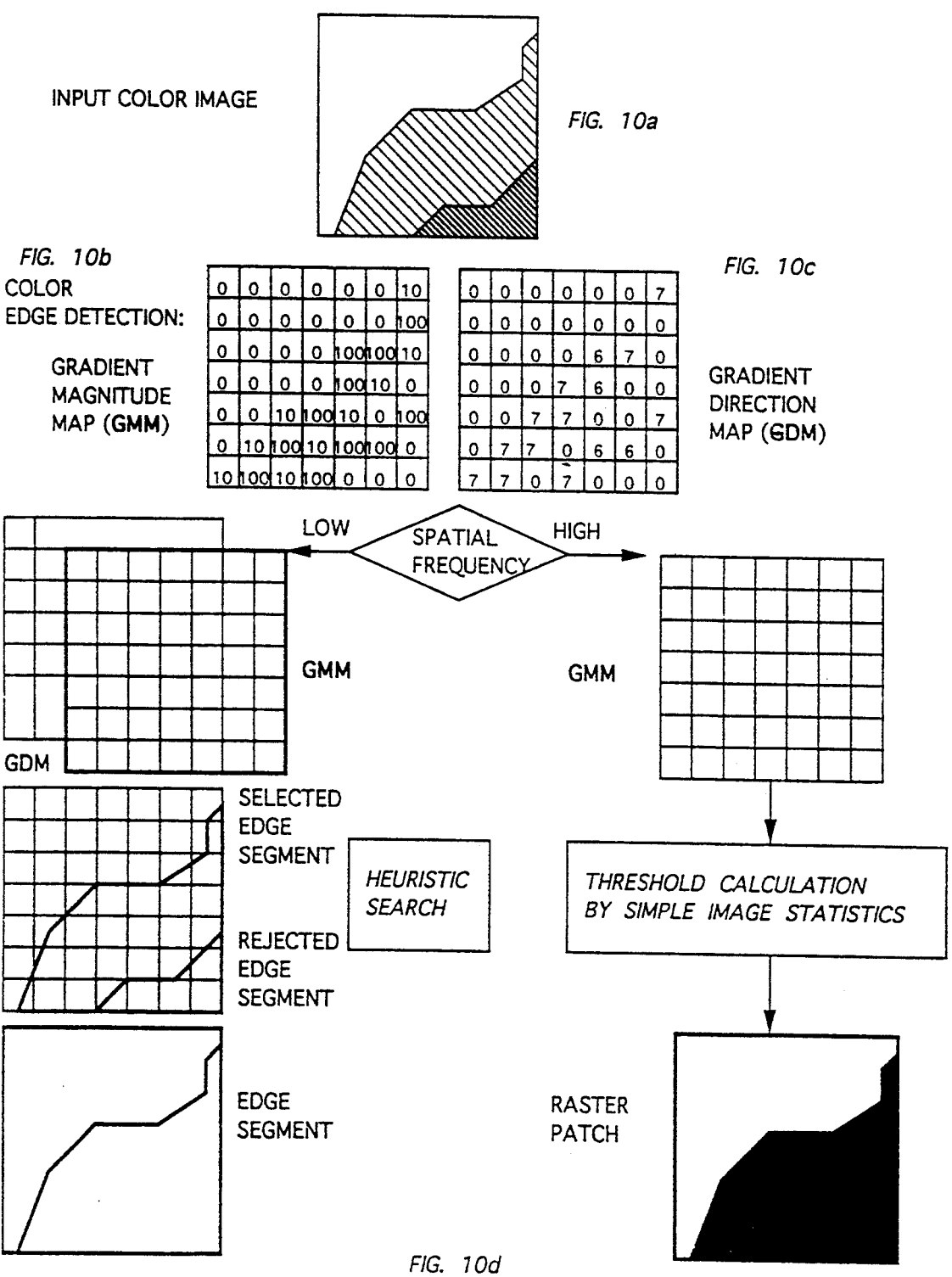

A third condition which, if encountered, causes the next region of search to be selected by interpolation, rather than by extrapolation, is indicated by block 80 in the flow chart of FIG. 5, and by the diagram of FIG. 9c. Thus, as shown by block 80 in FIG. 5, a check is made to determine whether the region of search position is within a predetermined threshold distance from the approximate boundary represented by the rough mask vector RM; if not, the next region of search is selected, not by extrapolation, but rather by interpolation, according to the procedure described above with respect to blocks 76 and 77 and the FIG. 9a diagram.

A check is then made to determine whether the current region of search position is within a predetermined distance from the next approximate boundary point (block 81). If not, the system returns to block 72; but if so, the system selects the next approximate boundary on the rough mask (RM) as a guideline (block 82).

A check is then made to determine whether the current approximate boundary is equal to the first approximate boundary (block 83); if not, the system returns again to block 72. However, if the current approximate boundary meets the first approximate boundary, this indicates that a loop has been completed, and the complete fine mask has been determined.

As will be described more particularly below with respect to the flow chart of FIG. 6, the so-defined fine mask may consist of boundary segments in the form of line segments and raster patches (the latter being in regions of searches having high spatial frequency). All the boundary segments, including the line segments and the raster patches, are then converted to a raster format, as indicated by block 84 in FIG. 5.

Processing Picture Data to Produce Boundary Segments

Figure 6:
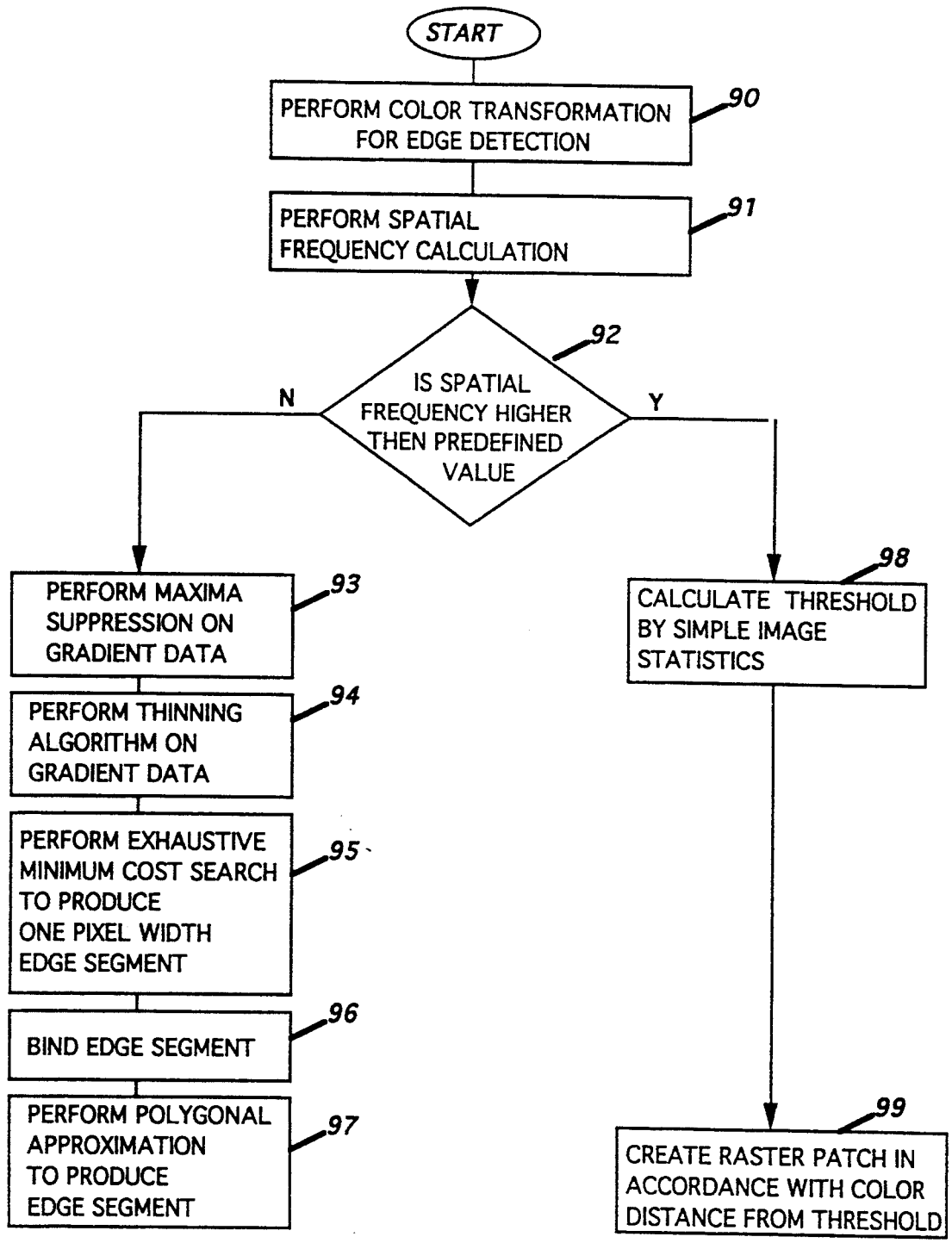
FIG. 6 is a flow chart illustrating the Search for Boundary Segment operations in the flow chart of FIG. 4.

The manner of processing the picture data to produce the boundary segments, as represented by block 73 in the flow chart of FIG. 5, is more particularly illustrated in the flow chart of FIG. 6 and in the pictorial diagram of FIGS. 10a–10d.

Thus, after the region of search position is selected, a colour transformation operation is performed for edge detection, as indicated by block 90, FIG. 6. This is accomplished by retrieving the region of search image data from the storage device in high resolution. The image data comes in four separations CMYK, and a colour edge detection is executed. Thus, the input to this stage is a CMY image (after transforming the black component) as shown in FIG. 10a; and the output are two colour gradient 8-bit maps, where high colour gradients are displayed as a high value (near 255), and low colour gradients are displayed as a low value (near 0). One map, as shown in FIG. 10b, defines the gradient (colour) magnitude, and the other map, as shown in FIG. 10c, defines the gradient (colour) direction. Procedures for edge detection and multispectral images are known; a preferred procedure is that described by Aldo Cumani in Graphical Models and Image Processing, No. 1, January, pp 40–51 (1991).

A spatial frequency calculation is then performed (block 91) to determine the density of the direction changes in the selected region of search. That is, the number of edges per unit area in the selected region of search are counted and the result is compared with a predefined threshold value (block 92). If the spatial frequency is not higher than the predefined threshold value, a heuretic search is performed (as will be described more particularly below) in order to find the boundary segment in the respective region of search; on the other hand, if the spatial frequency is higher than the predefined value (as may occur, for example, in a region of search including fine human hairs), the normal procedure for determining the boundary segment would probably fail, and therefore a raster patch is produced in the respective region of search, rather than a boundary segment FIG. 11a). The foregoing operatioons are pictorially illustrated in FIG. 10d.

As shown in FIG. 6, when the spatial frequency is found (block 92) to be not higher than the predefined value, the boundary segment in the region of search is produced as follows: First, a maxima suppression on gradient data operation is performed (block 93) to suppress the edges below a threshold so as to produce only the strong edges. A thinning operation is then performed on the gradient data (block 94), and then an exhaustive minimum cost search is performed to produce one-pixel-width edge segments (block 95). For the latter purpose, there may be used the Shou-Shu algorithm (e.g., as described in the article One-Pixel-Widge Edge Detection, Pattern Recognition, Vol. 22, jjNo. 6, pp 665–673, 1989) but it is preferable to use the guidelines of the rough mask vector as part of the weighted cost function.

The edge segments are then bound together (block 96), and a polygonal approximation is performed to produce the boundary segment (block 97). A suitable algorithm for performing this operation is that described by Wall and Danielson in Computer Vision, Graphics and Image Processing 28, 220–227 (1984). The output is thus a polygon vector data.

On the other hand, if the selected region of search was found to have high spatial frequency (block 92), a raster patch is produced rather than a boundary segment. In such case, the threshold is calculated by simple image statistics (block 98) e.g., per the Kittier and Illingworth algorithm, as described in Threshold Selection Based on a Simple Image Statistic, appearing in Computer Vision, Graphics and Image Processing 30, 125–147 (1985).

After the threshold has thus been calculated, a raster patch is calculated in accordance with the colour distance from the threshold (block 99).

It will thus be seen that the output of the processor illustrated by the flow chart of FIG. 6 will be either a chain code defining an edge segment, or a raster description defining a raster patch. This data may be processed to create a multiple-bit mask according to the diagrams illustrated in FIGS. 11a–11c.

Figure 11A:
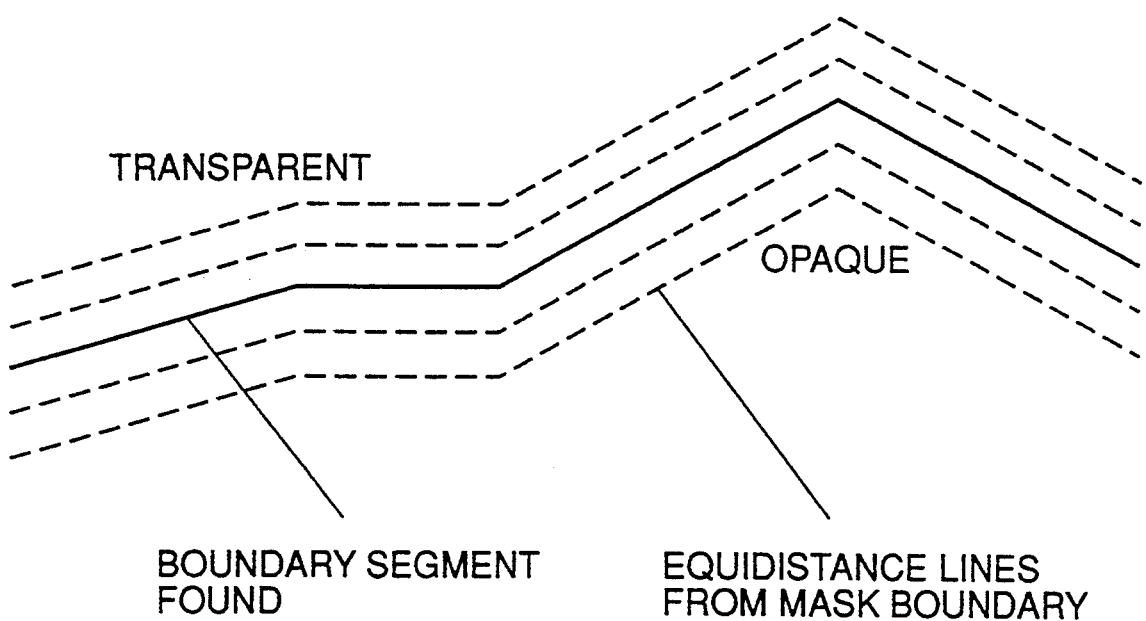
FIGS. 11a–11c are diagrams helpful in explaining the multiple bit mask calculation procedure in the described method for preparing a mask.
Figure 11B:
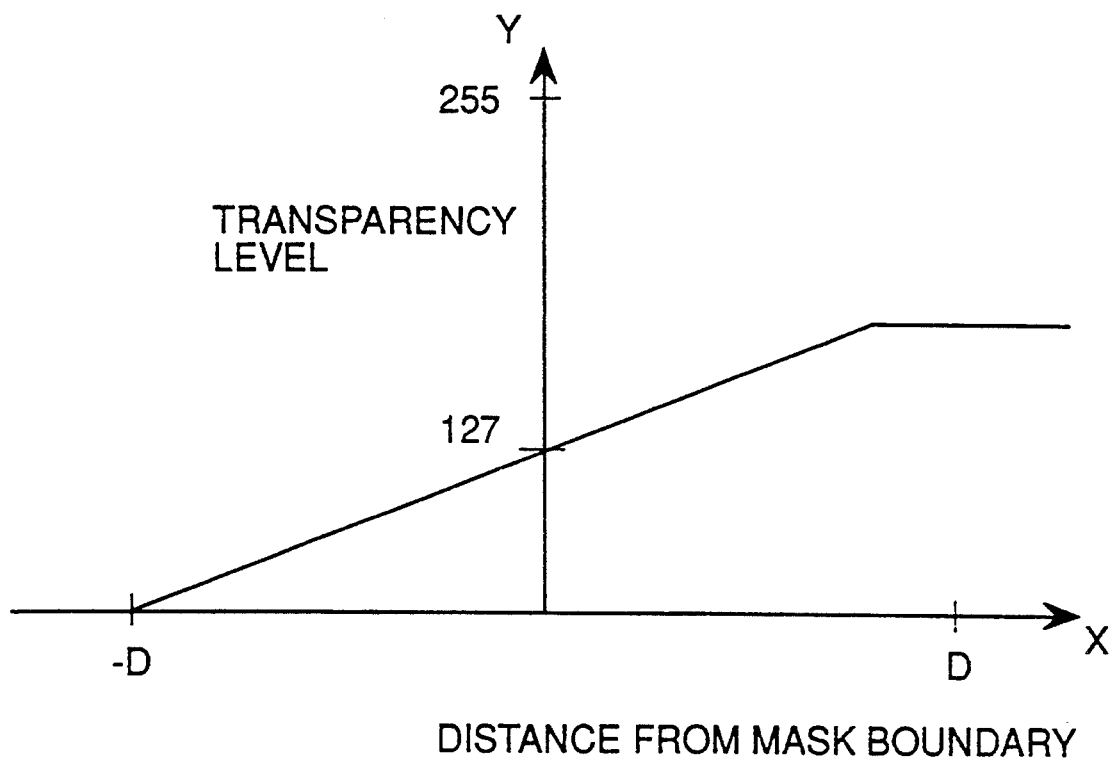

Thus, FIGS. 11a and 11b illustrate the processing of an edge segment to create an eight-bit (or multiple-bit) edge segment, i.e., representing different transparency levels. In this case, each pixel in the edge segment is assigned a multiple-bit value in accordance with its spatial distance from the found edge segment.

Figure 11C:
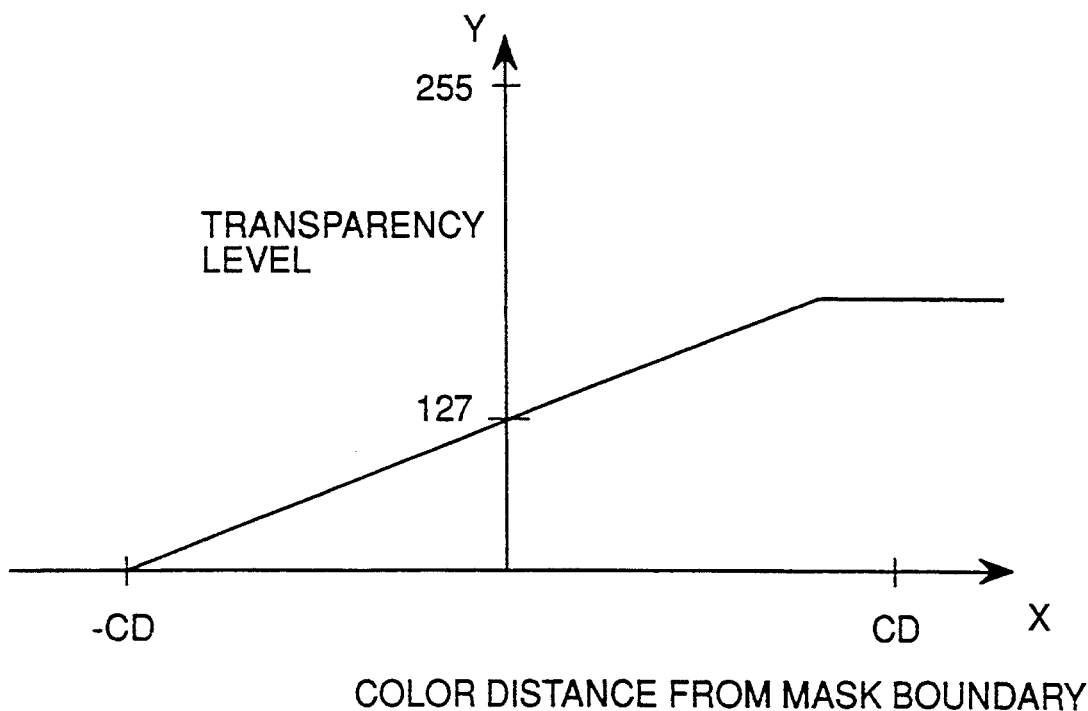

FIG. 11c illustrates the manner of producing a multiple-bit map from boundary segments representing raster patches. In this case, each pixel in the raster patch is assigned a multiple-bit value in accordance with its colour distance from the calculated threshold.

It will thus be seen that the output of the operations illustrated by the flow chart of FIG. 6 will be vector data for regions of search having a spatial frequency equal to or lower than a predefined threshold value, and raster data for regions of search having a spatial frequency higher than the predefined value. The vector data and raster data are comverted to a raster format to produce a combined raster mask, as indicated by block 84 in FIG. 5.

While the invention has been described with respect to one preferred embodiment, it will be appreciated that this is set forth merely for purposes of example, and that many other variations, modifications and applications of the invention may be made.

What is claimed is:

1. A method of preparing a fine mask of a boundary on a picture of an area of interest to be separated from the remainder of the picture, comprising the operations:

(a) storing in storage means a digitized representation of the picture, and of a rough mask defining the approximate boundary of the area of interest;

(b) selecting a first region of search of predetermined configuration starting with one point on the rough mask;

(c) retrieving picture data within the selected region of search from the storage means and processing said retrieved picture data to identify a boundary segment representing the portion of the boundary within the region of search;

(d) selecting the position of the next region of search by extrapolation from the preceding region of search in the direction of the boundary segment identified in the preceding region of search;

(e) retrieving picture data within said next region of search from the storage means and processing said retrieved picture data to identify the next boundary segment representing the position of the boundary within said next region of search; and (f) repeating operations (d) and (e), to successively select the next regions of search by extrapolation and to find the boundary segments therein, until the next region of search meets the first region of search, or until encountering the condition that a boundary segment is not found in the region of search, whereupon the next region of search is selected by interpolation between the preceding region of search and the closest point on the approximate boundary defined by the rough mask.

2. The method according to claim 1, wherein operations (d) and (e) are repeated per operation (f) until encountering a second condition, that the boundary segment is not found to be in the region of search within a predetermined distance from the approximate boundary defined by the rough mask, whereupon the next region of search is also selected by the same manner of interpolation as when said first condition is encountered.

3. The method according to claim 2, wherein operations (d) and (e) are repeated per operation (f) until encountering a third condition, that the boundary segment is not found to be in the region of search within a predetermined angle from the approximate boundary defined by the rough mask, whereupon the next region of search is also selected by the same manner of interpolation as when said first condition is encountered.

4. The method according to claim 1, wherein, whenever a region of search position is selected by interpolation, the region of search for finding a boundary segment is increased in size over said predetermined size.

5. The method according to claim 4, wherein, whenever a region of search position is selected by interpolation, the region of search for finding a boundary segment is doubled in size over said predetermined size.

6. The method according to claim 1, including the further operation of converting all the boundary segments to a raster format.

7. The method according to claim 1, wherein, when a region of search is selected, an examination is performed to determined whether the picture content within the selected region of search is of a spatial frequency higher than a predefined value, and if so, a raster patch is produced in the respective region of search rather than a boundary segment; said raster patch being converted with all the found boundary segments to a raster format following operation (f).

8. The method according to claim 7, including the further operation of performing a colour transformation for edge detection operation before making the spatial frequency examination.

9. The method according to claim 7, wherein following the spatial frequency examination, the produced boundary segments in the regions of search having a lower spatial frequency than a predefined value are thinned to produce single-pixel-width edge segments using the rough mask as a guideline.

10. The method according to claim 9, wherein, following the spatial frequency examination, the pixels in the raster patches produced in the regions of search having a spatial frequency higher than a predefined value are converted to a one-bit value in accordance with a calculated threshold.

11. The method according to claim 10, including the further operation of converting all the boundary segments to a raster formal.

12. The method according to claim 11, wherein, in converting all the boundary segments to a raster format, all the edge segments are converted to a raster format by assigning each pixel in the mask a multiple-bit value in accordance with the spatial distance of the pixel from the found edge segment.

13. The method according to claim 12, wherein, in converting all the boundary segments to a raster format, all the raster patches are converted to a raster format by assigning each pixel in the mask a multiple-bit value in accordance with its colour distance from a calculated threshold.

14. A method of preparing a fine mask of a boundary on a picture of an area of interest to be separated from the remainder of the picture, comprising the operations:

(a) storing in storage means a digitized representation of the picture, and of a rough mask defining the approximate boundary of the area of interest;

(b) selecting a first region of search of predetermined configuration starting with one point on the rough mask;

(c) retrieving picture data within the selected region of search from the storage means and processing said retrieved picture data to find a boundary segment representing the portion of the boundary within the region of search;

(d) repeating operations (b) and (c) to successively select the next regions of search in order to find and produce the boundary segments therein;

(e) in each region of search, examining the picture content within the respective region of search to determine whether the picture content is of a spatial frequency higher than a predefined value, and if so, producing a raster patch in the respective region of search, rather than a boundary segment; and (f) when a subsequent region of search meets the first region of search, converting all the produced boundary segments, and raster patches, to a raster format.

15. Apparatus for preparing a fine mask of a boundary on a picture of an area of interest to be separated from the remainder of the picture, comprising:

storage means for storing a digitized representation of the picture, and of a rough mask defining the approximate boundary of the area of interest;

selecting means for selecting a first region of search of predetermined configuration starting with one point on the rough mask;

and data processor means programmed for performing the following operations:
(1) retrieving picture data within the selected region of search from the storage means and processing said retrieved picture data to identify a boundary segment representing the portion of the boundary within the region of search;
(2) selecting the position of the next region of search by extrapolation from the preceding region of search in the direction of the boundary segment identified in the preceding region of search;
(3) retrieving picture data within said next region of search from the storage means and processing said retrieved picture data to identify the next boundary segment representing the position of the boundary within said next region of search; and
(4) repeating operations (d) and (e), to successively select the next regions of search by extrapolation and to find the boundary segments therein, until the next region of search meets the first region of search, or until encountering the condition that a boundary segment is not found in the region of search, whereupon the next region of search is selected by interpolation between the preceding region of search and the closest point on the approximate boundary defined by the rough mask.

16. The apparatus according to claim 15, wherein said data processor is preprogrammed to repeat operations (2) and (3) per operation (4) until encountering a second condition, that the boundary segment is not found to be in the region of search within a predetermined distance from the approximate boundary defined by the rough mask, whereupon the next region of search is also selected by the same manner of interpolation as when said first condition is encountered.

17. The apparatus according to claim 16, wherein said data processor is preprogrammed to repeat operations (2) and (3) per operation (4) until encountering a third condition, that the boundary segment is not found to be in the region of search within a predetermined angle from the approximate boundary defined by the rough mask, whereupon the next region of search is also selected by the same manner of interpolation as when said first condition is encountered.

18. The apparatus according to claim 15, wherein said data processor is preprogrammed such that, whenever a region of search position is selected by interpolation, the region of search for finding a boundary segment is increased in size over said predetermined size.

19. The apparatus according to claim 18, wherein said data processor is preprogrammed such that, whenever a region of search position is selected by interpolation, the region of search for finding a boundary segment is doubled in size over said predetermined size.

20. The apparatus according to claim 15, wherein data processor is preprogrammed to include the further operation of converting all the boundary segments to a raster format.

21. The apparatus according to claim 15, wherein said data processor is preprogrammed such that, when a region of search is selected, an examination is performed to determined whether the picture content within the selected region of search is of a spatial frequency higher than a predefined value, and if so, a raster patch is produced in the respective region of search rather than a boundary segment; said raster patch being converted with all the found boundary segments to a raster format following operation (f).

22. The apparatus according to claim 21, wherein said data processor is preprogrammed to include the further operation of performing a colour transformation for edge detection operation before making the spatial frequency examination.

23. The apparatus according to claim 21, wherein said data processor is preprogrammed such that, following the spatial frequency examination, the produced boundary segments in the regions of search having a lower spatial frequency than a predefined value are thinned to produce single-pixel-width edge segments using the rough mask as a guideline.

24. The apparatus according to claim 23, wherein said data processor is preprogrammed such that, following the spatial frequency examination, the pixels in the raster patches produced in the regions of search having a spatial frequency higher than a predefined value are converted to a one-bit value in accordance with a calculated threshold.

25. The apparatus according to claim 24, wherein the data processor is preprogrammed to include the further operation of converting all the boundary segments to a raster formal.

26. The apparatus according to claim 25, wherein the data processor is preprogrammed such that, in converting all the boundary segments to a raster format, all the edge segments are converted to a raster format by assigning each pixel in the mask a multiple-bit value in accordance with its spatial distance from the found edge segment.

27. The apparatus according to claim 26, wherein the data processor is preprogrammed such that, in converting all the boundary segments to a raster format, all the raster patches are converted to a raster format by assigning each pixel in the mask a multiple-bit value in accordance with its colour distance from a calculated threshold.

28. Apparatus for preparing a fine mask of a boundary on a picture of an area of interest to be separated from the remainder of the picture, comprising:
storage means for storing a digitized representation of the picture, and of a rough mask defining the approximate boundary of the area of interest;
selecting means for selecting a first region of search of predetermined configuration starting with one point on the rough mask;
and data processor means programmed for performing the following operations:
(1) retrieving picture data within the selected region of search from the storage means and processing said retrieved picture data to find a boundary segment representing the portion of the boundary within the region of search;
(2) repeating operations (b) and (c) to successively select the next regions of search in order to find and produce the boundary segments therein;
(3) in each region of search, examining the picture content within the respective region of search to determine whether the picture content is of a spatial frequency higher than a predefined value, and if so, producing a raster patch in the respective region of search, rather than a boundary segment; and
(4) when a subsequent region of search meets the first region of search, converting all the produced boundary segments, and raster patches, to a raster format.

* * * * *